United States Patent
Sato

(10) Patent No.: US 10,444,466 B2
(45) Date of Patent: Oct. 15, 2019

(54) DRIVING DEVICE

(71) Applicant: CANON KABUSHIKI KAISHA, Tokyo (JP)

(72) Inventor: Katsuhiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 15/426,919

(22) Filed: Feb. 7, 2017

(65) Prior Publication Data

US 2017/0235091 A1 Aug. 17, 2017

(30) Foreign Application Priority Data

Feb. 17, 2016 (JP) ................. 2016-028389

(51) Int. Cl.
| | |
|---|---|
| *G02B 7/09* | (2006.01) |
| *H02K 7/116* | (2006.01) |
| *H02K 23/00* | (2006.01) |
| *H02K 37/00* | (2006.01) |
| *H02N 2/10* | (2006.01) |

(52) U.S. Cl.
CPC .............. *G02B 7/09* (2013.01); *H02K 7/116* (2013.01); *H02K 23/00* (2013.01); *H02K 37/00* (2013.01); *H02N 2/101* (2013.01)

(58) Field of Classification Search
CPC .......... G02B 7/09; H02K 7/116; H02K 23/00; H02K 37/00; H02N 2/101
USPC ................................................. 359/822–830
See application file for complete search history.

(56) References Cited

U.S. PATENT DOCUMENTS

| | | | | |
|---|---|---|---|---|
| 5,222,407 A | * | 6/1993 | Sekiguchi | F16D 7/024 192/56.1 |
| 5,561,564 A | * | 10/1996 | Nakamura | G02B 7/102 359/700 |
| 5,701,208 A | * | 12/1997 | Sato | G02B 7/10 359/696 |
| 5,959,786 A | * | 9/1999 | Yamamoto | G02B 7/10 359/694 |
| 6,456,796 B1 | | 9/2002 | Tanaka et al. | |
| 6,822,809 B2 | * | 11/2004 | Yokoyama | G02B 7/102 359/696 |
| 7,116,502 B2 | * | 10/2006 | Kawanami | G02B 7/023 359/823 |
| 7,680,409 B2 | * | 3/2010 | Kurosawa | G03B 13/34 192/45.006 |
| 8,982,485 B2 | * | 3/2015 | Arakawa | G02B 7/04 359/819 |

(Continued)

FOREIGN PATENT DOCUMENTS

| | | |
|---|---|---|
| JP | 07-119753 A | 5/1995 |
| JP | 2003-329089 A | 11/2003 |
| JP | 2008-058914 A | 3/2008 |

*Primary Examiner* — Collin X Beatty
(74) *Attorney, Agent, or Firm* — Canon U.S.A. Inc., IP Division

(57) ABSTRACT

A driving device includes a driving motor, a first gear 3-1, and a gear 3-2 having a smaller diameter than the gear 3-1. Driving force from the driving motor is transmittable to a driven object when the gear 3-2 moves in an axial direction of a rotation shaft to be coupled to the gear 3-1. When the gear 3-2 moves in the axial direction to be decoupled from the gear 3-1, the driving force from the driving motor can be prevented from being transmitted to the driven object.

12 Claims, 8 Drawing Sheets

(56) References Cited

U.S. PATENT DOCUMENTS

2002/0036843 A1\* 3/2002 Nomura ................... G02B 7/10
359/819
2011/0194198 A1\* 8/2011 Iida ........................ G02B 7/102
359/817

\* cited by examiner

POWER-DRIVE MODE

MANUAL MODE

DRIVING DEVICE

BACKGROUND OF THE INVENTION

Field of the Invention

The present disclosure relates to a driving device.

Description of the Related Art

In recent years, driving devices have been actively developed that transmit driving force from a motor to a lens unit via a plurality of gears, so that the lens unit can be moved in an optical axis direction. Such a driving device is discussed in Japanese Patent Application Laid-Open No. 2003-329089.

The driving device discussed in Japanese Patent Application Laid-Open No. 2003-329089 has a configuration in which a power-drive mode and a manual mode can be changed. In the power-drive mode, the lens unit is moved by the motor. In the manual mode, the lens unit is moved by the user rotating a ring disposed on an outer circumference of the lens barrel. More specifically, the configuration features a switch for moving some of a plurality of gears that receives the driving force from the motor, in a rotational axis direction of the gears. Thus, some of the plurality of gears are released or they mesh with each other.

However, in the configuration discussed in Japanese Patent Application Laid-Open No. 2003-329089, it is necessary to prepare a space at a movement destination of a stepped gear so that a large diameter portion of the stepped gear does not interfere with other components when the stepped gear moves to change between the power-drive mode and the manual mode. Thus, the driving device with the configuration discussed in Japanese Patent Application Laid-Open No. 2003-329089 may be large as a whole.

SUMMARY OF THE INVENTION

The present disclosure is directed to a driving device small in size.

According to an aspect of the present disclosure, a driving device configured to transmit driving force to a driven object includes a driving source, a first driving member configured to be rotatable about a rotation shaft and that has a position fixed in an axial direction of the rotation shaft, and a second driving member that has a smaller diameter than the first driving member, is rotatable about the rotation shaft, and configured to move in the axial direction to be coupled with the first driving member so that the driving force from the driving source becomes transmittable to the driven object, and further configured to move in the axial direction to be decoupled from the first driving member so that the driving force from the driving source is prevented from being transmitted to the driven object.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. It is to be noted that relative positions and the like of components described in the exemplary embodiments can be changed as appropriate in accordance with the configuration and various conditions of a device employing embodiments of the present disclosure. More specifically, the present disclosure is not limited to the exemplary embodiments described below, and can be modified and changed in various manners without departing from the gist of the present disclosure.

The exemplary embodiments of the present disclosure are described below in detail with reference to the attached drawings.

A driving device, a lens driving device, and a lens barrel on which the lens driving device can be mounted according to a first exemplary embodiment are described below with reference to FIGS. 1 to 5B.

<Configuration of Lens Barrel>

Figure 1:
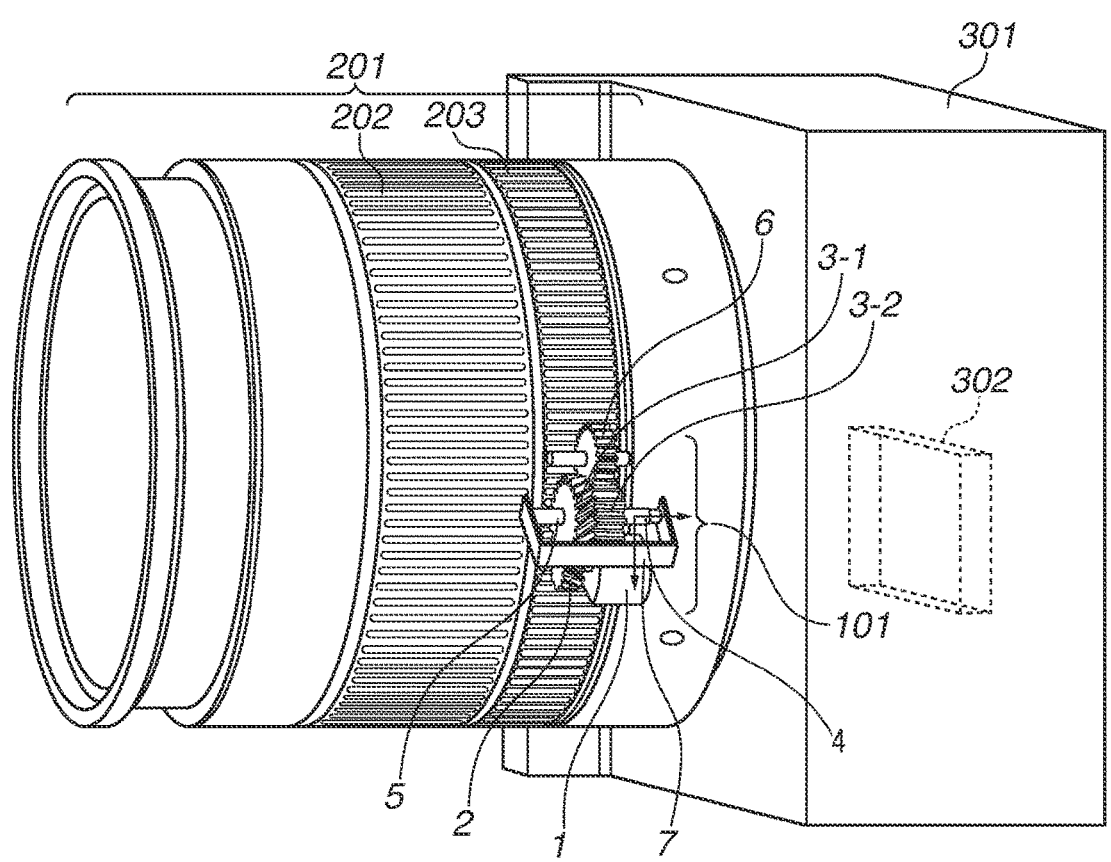
FIG. 1 is a diagram illustrating a relationship between a lens driving device and a lens barrel according to a first exemplary embodiment.

FIG. 1 is a diagram illustrating a relationship between the driving device and the lens barrel according to the present exemplary embodiment. A lens barrel 201 includes a plurality of lens units. At least one of the plurality of lens units moves in an optical axis direction so that a distance to an adjacent lens unit changes when zooming or focusing is performed. In the present exemplary embodiment, the lens barrel 201 includes a zoom lens unit and a focus lens unit that move in the optical axis direction so that zooming and focusing are performed, respectively. The term lens unit does not necessarily represent a lens group including a plurality of lenses, and may represent a single lens that moves in the optical axis direction when the zooming or the focusing is performed.

The zoom lens unit or the focus lens unit moves in the optical axis direction as described above, when a lens driving ring 202 (operation member) rotates about an optical axis. A lens gear 203 is integrally formed with the lens driving ring 202 in such a manner that the lens driving ring 202 rotates when the lens gear 203 rotates about the optical axis.

<Configuration of Image Capturing Apparatus>

A camera main body (image capturing apparatus) 301 detachably holds the lens barrel 201, and includes an image sensor 302 that photoelectrically converts light through the lens barrel 201.

<Configuration of Driving Device and Lens Driving Device>

A driving device 101 includes a driving source and a gear train structure including a plurality of gears. Driving force from the driving source is transmitted to a driven object through the gear train structure. The term of transmission of the driving force means transmission of the driving force to the driven object that is directly engaged thereto, and transmission of the driving force to the driven object via gears and the like.

A driving motor 1 serves as the driving source, and may be a direct current (DC) motor, a piezoelectric actuator, and a step motor. A gear 2 is a gear through which the rotation of the driving motor 1 is transmitted to a gear on the subsequent stage. In the present exemplary embodiment, the gear 2 is a helical gear to achieve silent operation. A gear 3-1 (first driving member or first gear) meshes with the gear 2, and is a helical gear to match the gear 2. A gear 3-2 (second driving member or second gear) is coaxially arranged with respect to the gear 3-1, and is a spur gear. A compression coil spring 4 biases the gear 3-2 toward the gear 3-1.

A rotation shaft 5 is inserted through the gear 3-1 and the gear 3-2 and includes a shaft portion 5a that engages in the gear 3-1, a shaft portion 5b thinner than the shaft portion 5a, and a flange portion 5c at a position where the diameter changes between the shaft portion 5a and the shaft portion 5b. An E-type retaining ring (ring member) 9, described below and illustrated in FIG. 3, and flange portion 5c enables the gear 3-2 to rotate about the rotation shaft 5 and move together with the rotation shaft 5 in an axial direction of the rotation shaft 5. A gear 6 (third driving member or third gear) meshes with the lens gear 203, when the driving device 101 is mounted on the lens barrel 201. A shaft pressing mechanism (selection unit) 7 is used for changing between the power-drive mode and the manual mode.

Figure 2:
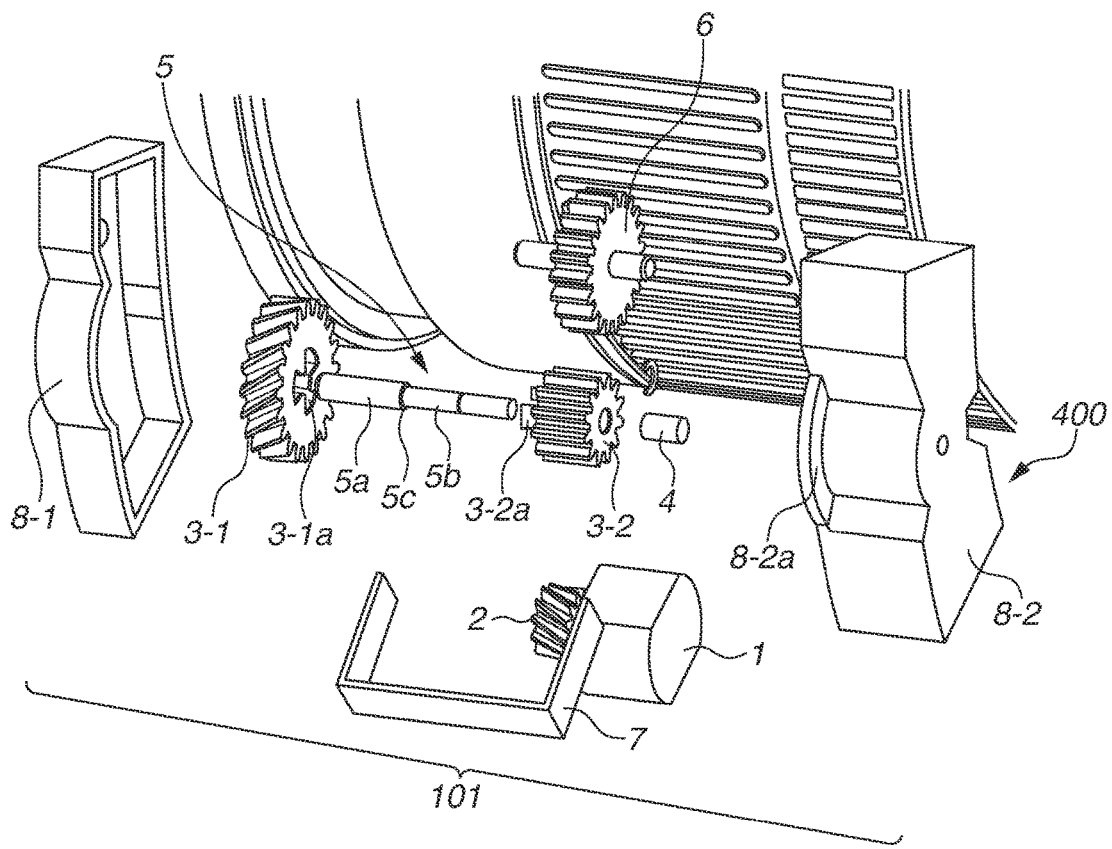
FIG. 2 is an exploded perspective view of the lens driving device according to the first exemplary embodiment.

Only the driving device 101 is illustrated in FIG. 1, the driving device 101 is held by gear boxes (holding members) 8-1 and 8-2 illustrated in FIG. 2. The gear box 8-2 has a restricting member 8-2a with which the movement of the gear 3-1 in the axial direction is restricted when modes are changed. The driving device 101, the gear boxes 8-1 and 8-2, and an attachment structure (not illustrated) form a lens driving device 400.

<Configuration of Changing Mechanism>

Next, a configuration of the changing mechanism that changes between the power-drive mode and the manual mode is described with reference to FIGS. 3 to 5B. In the power-drive mode, the lens unit moves in the optical axis direction with the driving force from the driving motor 1 transmitted to the lens driving ring 202 via the gear 6 and the lens gear 203. On the other hand, in the manual mode, the driving force may be generated by the driving motor 1 but is not transmitted to a side of the lens barrel 201, and thus the lens unit moves in the optical axis direction when the lens driving ring 202 is rotated.

<Positional Relationship Between Gears in Manual Mode>

Figure 3:
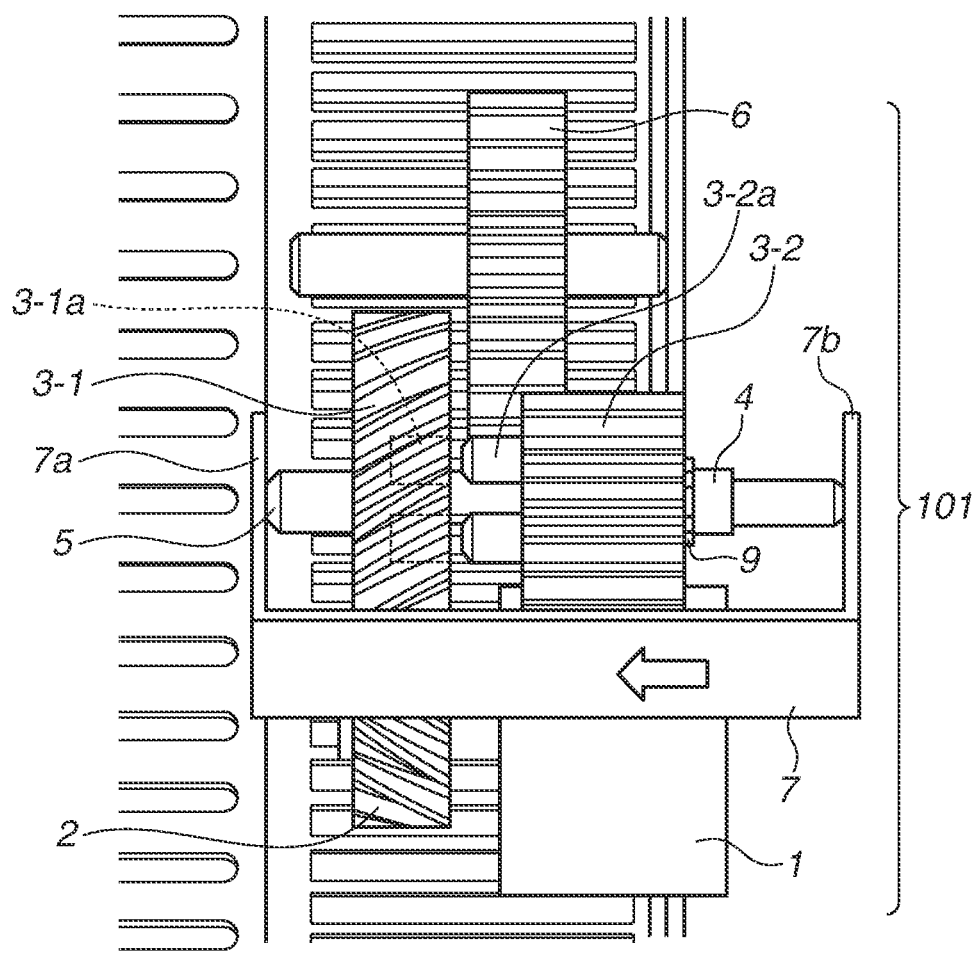
FIG. 3 is a diagram illustrating the lens driving device and the lens barrel in a manual mode according to the first exemplary embodiment.

First, the positional relationship between the gears in the manual mode is described with reference to FIG. 3. Although not illustrated in FIG. 1 and FIG. 2 described above, the gear 3-2 includes a plurality of protrusions 3-2a (protrusions) extending toward the gear 3-1, and the gear 3-1 includes a plurality of protrusion receivers 3-1a (recesses) into which the protrusions 3-2a are engaged. As illustrated in FIG. 3, in the manual mode, the protrusions 3-2a are not engaged in the protrusion receivers 3-1a. Thus, the driving force from the driving motor 1 is not transmitted to the side of the lens barrel 201 via the gear 3-2 and the gear 6. As a result, the zooming and focusing can be performed by moving the lens unit in the optical axis direction by manually rotating the lens driving ring 202.

More specifically, the gear 3-1 idles when the driving motor 1 rotates in a second state, in which the gear 3-2 has moved in the axial direction to be decoupled from the gear 3-1.

Then, when the shaft pressing mechanism 7 is operated in a direction indicated by an arrow illustrated in FIG. 3, the manual mode can be changed to the power-drive mode. A configuration of the shaft pressing mechanism 7 and how changing between the modes is achieved are described in detail below.

<Positional Relationship Between Gears in Power-Drive Mode>

Figure 4:
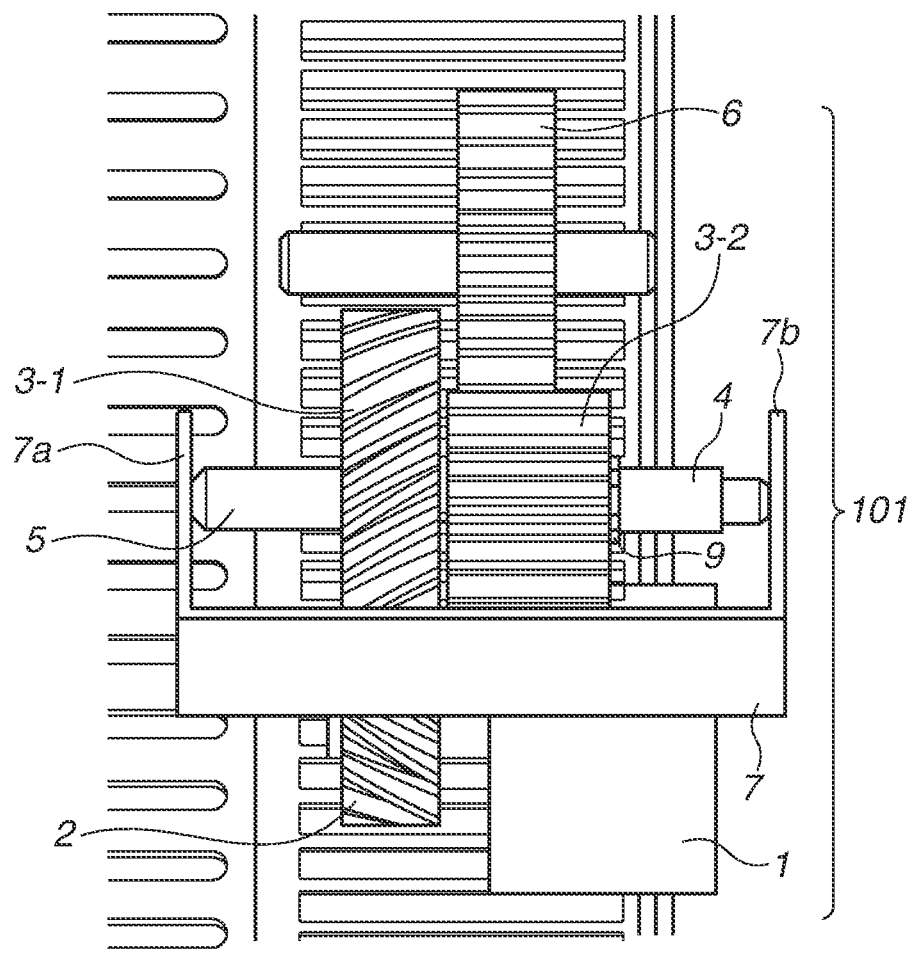
FIG. 4 is a diagram illustrating the lens driving device and the lens barrel in a power-drive mode according to the first exemplary embodiment.

When the shaft pressing mechanism 7 is operated to change the manual mode to the power-drive mode, the protrusions 3-2a engage in the protrusion receivers 3-1a as illustrated in FIG. 4. Therefore, the driving force from the driving motor 1 is transmitted to the gear 3-2 via the gear 3-1. As a result, the driving force from the driving motor 1 is transmitted to the side of the lens barrel 201 via the gear 3-2 and the gear 6. Thus, the zooming or focusing can be performed through the movement of the lens unit in the optical axis direction.

As described above, the driving force from the driving motor 1 is transmitted to the lens gear 203 (driven object) via the gear 6 when the driving motor 1 is driven in a first state in which the gear 3-2 and the gear 3-1 are coupled with each other.

<Changing Between Power-Drive Mode and Manual Mode>

Figure 5A:
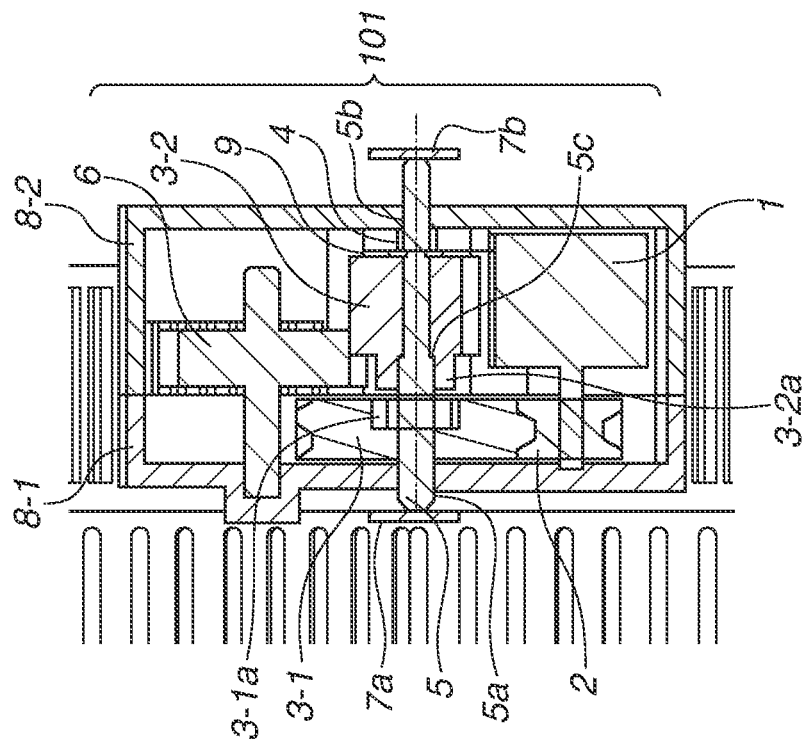
FIGS. 5A and 5B are diagrams illustrating a changing mechanism of the lens driving device according to the first exemplary embodiment.
Figure 5B:
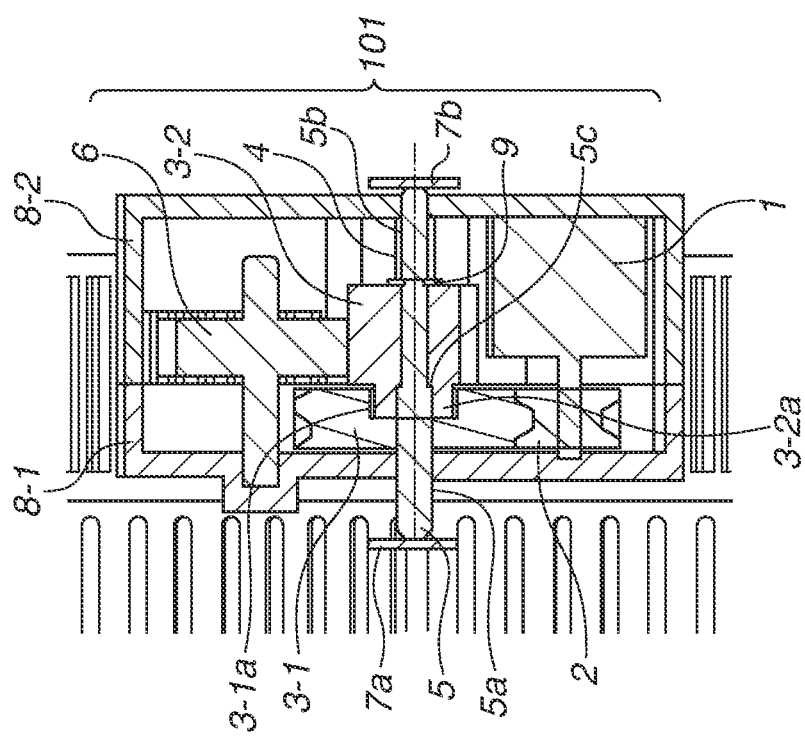

Next, the configuration of the shaft pressing mechanism 7 and the changing between the modes in detail are described with reference to FIGS. 5A and 5B. In the power-drive mode, the gear 3-2 and the gear 3-1 are coupled to each other with the protrusions 3-2a engaged in the protrusion receivers 3-1a as illustrated in FIG. 5A. To change the power-drive mode, achieved with the coupling state of the gears 3-2 and 3-1, to the manual mode, the shaft pressing mechanism 7 may be moved in a direction from the gear 3-1 toward the gear 3-2 with a changing switch (not illustrated). When the shaft pressing mechanism 7 moves in the direction from the gear 3-1 toward the gear 3-2, the rotation shaft 5 is pressed by a first shaft pressing portion 7a of the shaft pressing mechanism 7. As a result, the gear 3-2 is pressed by the flange portion 5c of the rotation shaft 5 so that the protrusions 3-2a move in the axial direction to be separated from the protrusion receivers 3-1a. Thus, the gear 3-1 and the gear 3-2 are decoupled from each other, so that the power-drive mode changes to the manual mode illustrated in FIG. 5B.

On the other hand, to change the manual mode to the power-drive mode, the shaft pressing mechanism 7 may be moved in a direction from the gear 3-2 toward the gear 3-1 with a changing switch (not illustrated). When the shaft pressing mechanism 7 moves in the direction from the gear 3-2 toward the gear 3-1, the rotation shaft 5 is pressed by a second shaft pressing portion 7b of the shaft pressing mechanism 7. As a result, the gear 3-2 moves closer to the gear 3-1, so that the protrusions 3-2a engage the protrusion receivers 3-1a. Thus, the gear 3-1 and the gear 3-2 are coupled to each other, whereby the manual mode is changed to the power-drive mode illustrated in FIG. 5A.

<How Downsizing is Achieved>

As described above, in the driving device 101 according to the present exemplary embodiment, the gear 3-2 is moved to be coupled to or decoupled from the gear 3-1. In this way, whether the driving force from the driving motor 1 is transmitted to the lens gear 203 (driven object) via the gear 6 is changed. As illustrated in FIGS. 1 to 5B described above, the gear 3-1 has a larger diameter than the gear 3-2 and has a fixed position in the axial direction of the rotation shaft, whereas the gear 3-2 is movable in the axial direction.

With such a configuration of the driving device 101, the modes can be changed by moving only the gear 3-2 with a smaller diameter in the axial direction.

Accordingly, compared to the conventional configuration in which the modes are changed by moving in the axial direction the entire stepped gear including a small diameter gear portion and a large diameter gear portion, the gear 3-1, which is the larger diameter gear portion, needs not to be moved. As a result, a space for moving the large gear portion can be eliminated, whereby a smaller driving device as well as a lens driving device and a lens barrel using this driving device can be achieved.

The driving device according to the present exemplary embodiment does not need to move one of the gears in the axial direction until meshing between certain two gears is completely released to change the modes, which is needed in the conventional configuration. More specifically, in the driving device according to the present exemplary embodiment, the modes can be changed without moving the gear 3-2 in the axial direction until the gear 3-2 and the gear 6 are completely released from each other. The gear 3-2 only needs to be moved by a distance long enough to separate the protrusions 3-2a from the protrusion receivers 3-1a. This also contributes to a smaller driving device, a lens driving device, and a lens barrel using the smaller driving device.

<How Downsizing and Silent Operation are Simultaneously Achieved>

As described above, in the present exemplary embodiment, the gears include the helical gear to achieve a silent operation. The meshing between spur gears can be released only by moving one of the spur gears entirely in the axial direction of the rotation shaft as in the conventional configuration. However, the meshing between helical gears cannot be released only by moving one of the helical gears in the axial direction of the rotation shaft. Therefore, the changing between the power-drive mode and the manual mode cannot be achieved as described above.

In contrast, in the exemplary embodiments of the present disclosure, the changing between the manual mode and the power-drive mode can be achieved not by decoupling the helical gears, but by employing the spur gear with a smaller diameter that can be decoupled from the helical gear by being moved in the axial direction. Accordingly, the exemplary embodiments of the present disclosure employ the configuration of moving the spur gear with a small diameter in the axial direction, and thus can achieve the downsizing of the driving device and can also achieve silent operation because the helical gear is used. The exemplary embodiments of the present disclosure are particularly effective when the changing between the modes occurs near a portion where the helical gear is disposed.

Figure 6:
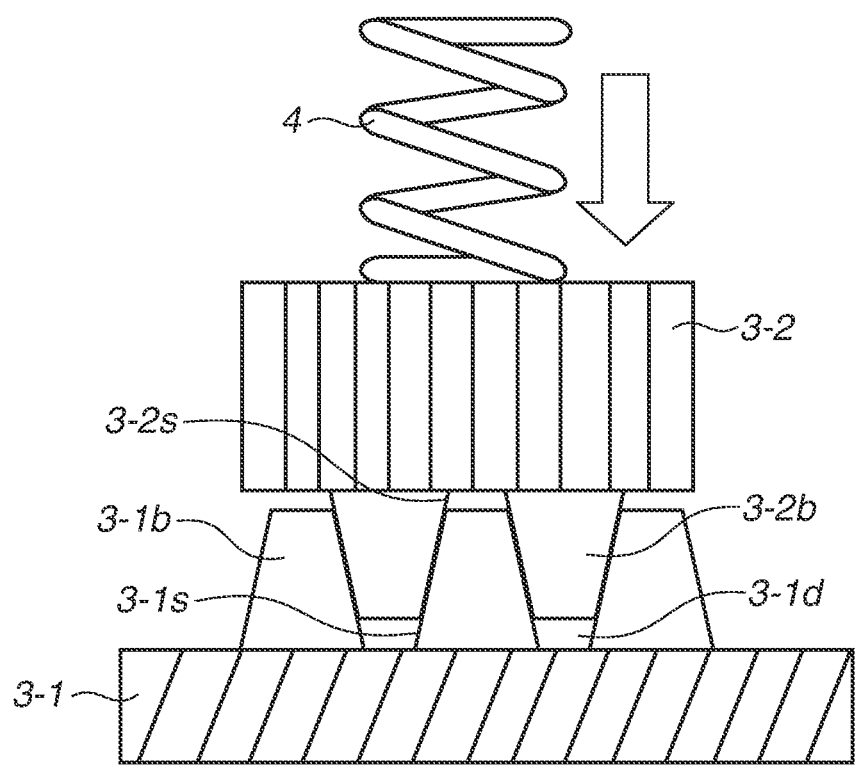
FIG. 6 is a diagram illustrating a changing mechanism of a lens driving device according to a second exemplary embodiment.

A driving device according to a second exemplary embodiment is described with reference to FIG. 6. The present exemplary embodiment is different from the first exemplary embodiment in the shapes of the protrusions and the protrusion receivers. As illustrated in FIG. 6, the gear 3-2 has protrusions 3-2b with inclined surfaces 3-2s (first inclined surfaces). Protrusion receivers 3-1d each disposed between adjacent ones of protrusions 3-1b of the gear 3-1 have inclined surfaces 3-1s (second inclined surface). In other words, the protrusions 3-2b and the protrusions 3-1b have a wedge shape to mesh with each other.

In such a configuration, assuming that the gear 3-2 is biased toward the gear 3-1 by the compression coil spring 4 with the positional relationship between the protrusions 3-2b and the protrusion receivers 3-1d being shifted in a rotational direction. In such a case, when the protrusions 3-2b are moved to engage in the protrusion receivers 3-1d, the inclined surfaces 3-2s come into contact with the inclined surfaces 3-1s. Therefore, the protrusions 3-2b slide on the inclined surfaces 3-1s to engage in the protrusion receivers 3-1d.

The inclined surfaces 3-1s and 3-2s, provided as described above, can avoid the following adverse effects. More specifically, the shifting of the positional relationship between the protrusions 3-2b and the protrusion receivers 3-1d in the rotational direction or the gap between the gears 3-1 and 3-2 and the rotation shaft 5 does not hinder the engaging of the protrusions 3-2b into the protrusion receivers 3-1d.

<Modification>

Figure 7A:
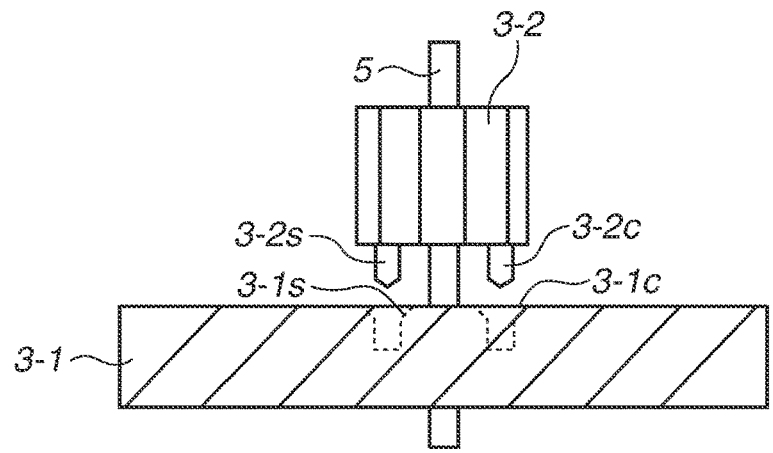
FIGS. 7A, 7B, and 7C are diagrams illustrating a changing mechanism of the lens driving device according to a modification of the second exemplary embodiment.

Next, a modification of the present exemplary embodiment will be described with reference to FIGS. 7A, 7B and 7C. The difference from the configuration illustrated in FIG. 6 is in that the protrusions and the protrusion receivers do not have entirely inclined side surfaces as illustrated in FIG. 7A. More specifically, as illustrated in FIG. 7A, the side surfaces of the protrusions 3-2c include inclined surfaces 3-2s on the distal end side and has the remaining portion extending in parallel with the axial direction. The side surfaces of the protrusion receivers 3-1c include inclined surfaces 3-1s on the side of the gear 3-2 and has the remaining portion extending in parallel with the axial direction.

Figure 7B:
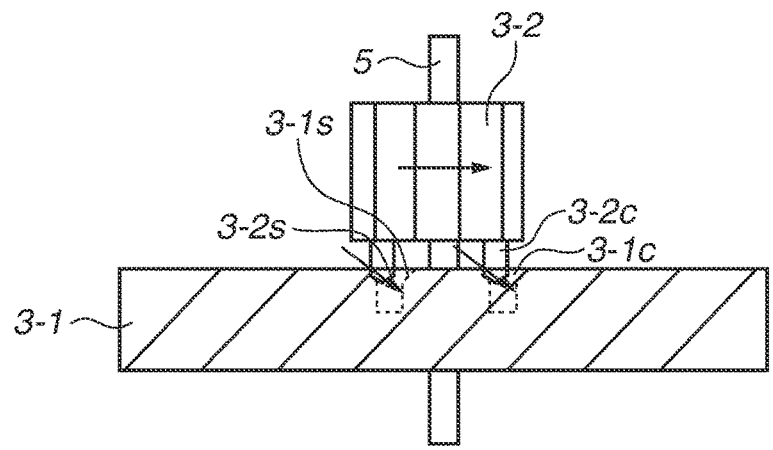
Figure 7C:
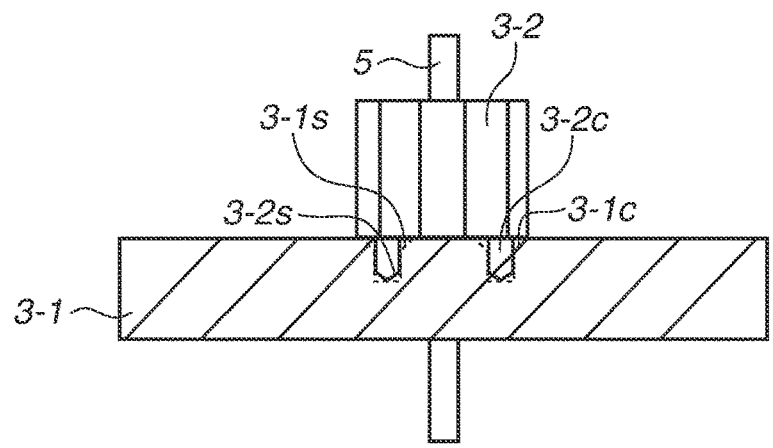

With this configuration, for example, as illustrated in FIG. 7B, the protrusions 3-2c misaligned with respect to the protrusion receivers 3-1c engage in the protrusion receivers 3-1c by sliding on the inclined surfaces 3-1s as indicated by arrows in FIG. 7B. As a result, the gear 3-2 can be coupled to the gear 3-1, as illustrated in FIG. 7C.

Figure 8A:
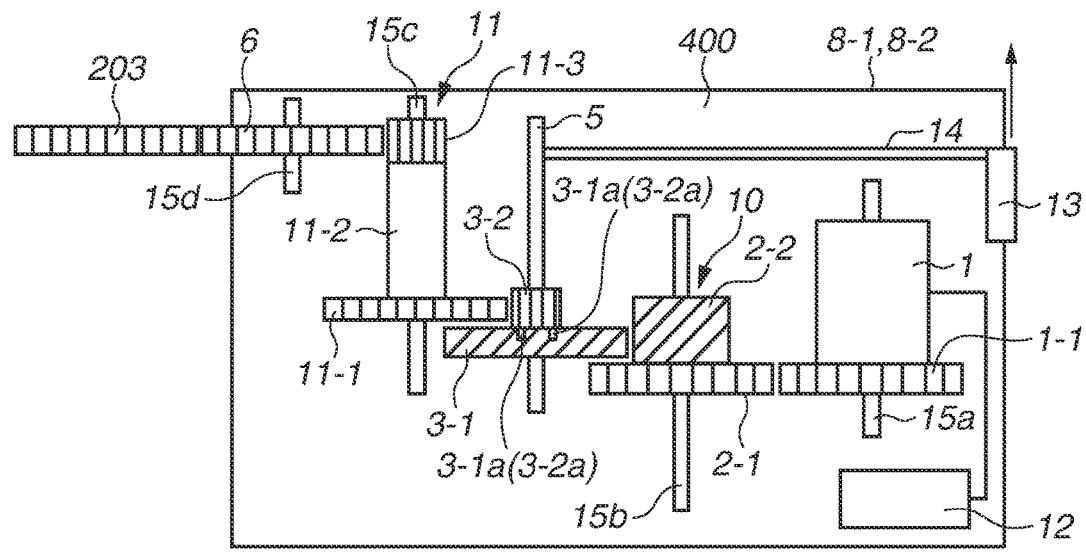
FIGS. 8A and 8B are diagrams illustrating a lens driving device according to a third exemplary embodiment.

Next, a configuration of a driving device according to a third exemplary embodiment of the present disclosure is described with reference to FIG. 8. The difference from the first exemplary embodiment is that more gears are provided, and that a structure replacing the shaft pressing mechanism 7 is provided. The gears illustrated in FIG. 8 have a slight gap therebetween actually mesh with each other.

In FIG. 8, a gear portion 1-1 rotates in conjunction with the driving motor 1. A rotation shaft 15a is provided for the gear portion 1-1. A stepped gear 10 includes a gear portion 2-1 that meshes with the gear portion 1-1 and a gear portion 2-2 that meshes with the gear 3-1. A rotation shaft 15b is provided for the stepped gear 10. The gear 3-1 and the gear 3-2 have the same configuration as those in the first exemplary embodiment described above. A stepped gear 11 (a fourth driving member or a fourth gear) includes a gear portion 11-1 that meshes with the gear 3-2, a flat portion 11-2, and a gear portion 11-3 that meshes with the gear 6 described above in the first exemplary embodiment, and is disposed between the gear 6 and the gear 3-2. A rotation shaft 15c is provided for the stepped gear 11 and a rotation shaft 15d is provided for the gear 6.

Figure 8B:
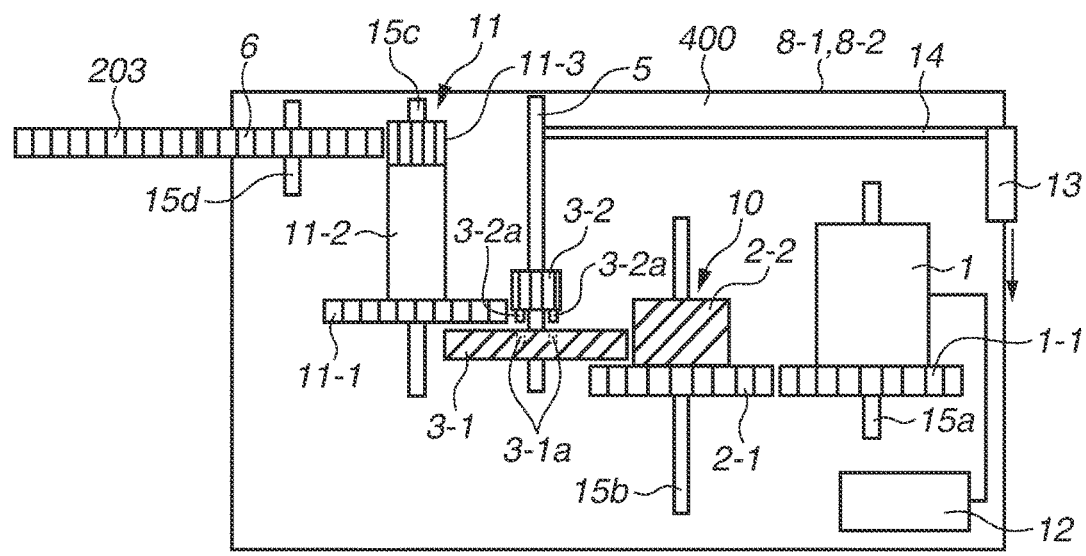

A power source 12 supplies power to the driving motor 1, and may be a battery or a dry-cell battery, for example. A mode changing switch 13 (selection unit) can be accessed from the outside of the lens driving device 400, and is coupled with the rotation shaft 5 via a coupling member 14. Therefore, when the changing switch 13 is moved in a direction indicated by an arrow in FIG. 8A in the power-drive mode illustrated in FIG. 8A in which the gear 3-2 is coupled to the gear 3-1, the gear 3-2 is decoupled from the gear 3-1 whereby the manual mode illustrated in FIG. 8B is achieved. The changing switch 13 may be moved in a direction indicated by an arrow in FIG. 8B to change the manual mode to the power-drive mode.

In the present exemplary embodiment, the gear 3-2 only needs to be moved by a distance only far enough to pull the protrusions 3-2a out from the protrusion receivers 3-1a, as in the first exemplary embodiment. Thus, in the first exemplary embodiment and the present exemplary embodiment, the gear 3-2 meshes with the adjacent gear regardless of whether the gear 3-2 is coupled to the gear 3-1 or not. The gear 3-2 is constantly in mesh with the gear 6 in the first exemplary embodiment described above, whereas the gear 3-2 maintains to mesh with the stepped gear 11 in the present exemplary embodiment. To achieve such a configuration, the protrusions 3-2a have a length in the axial direction of the rotation shaft 5 smaller than that of the gear portion 11-1 in the axial direction of the rotation shaft 15c.

In such a configuration, the gears need not to mesh again unlike in the configuration of changing the modes by completely releasing the gears from each other. This means that the configuration is free of a risk that the gear 3-2, which has moved in the axial direction to no longer mesh with the adjacent gear for changing the modes, fails to mesh with the adjacent gear due to the offsetting of the positional relationship between the gears in the rotational direction when the modes are changed back. This also means that a configuration for preventing the offsetting of the positional relationship in the rotational direction is not required, whereby a further smaller driving device as well as a lens driving device and a lens barrel using the driving device can be achieved.

Other Exemplary Embodiments

In the exemplary embodiments described above, the configurations are exemplified in which the gear 3-2 and the gear 3-1 are coupled to each other via the protrusions of the gear 3-2 and the protrusion receivers of the gear 3-1. However, the present disclosure is not limited to this configuration. For example, a configuration may be employed in which a surface of the gear 3-2 on the side of the gear 3-1 and a surface of the gear 3-1 on the side of the gear 3-2 may be formed of a material with a high friction coefficient or may be treated to have a high friction coefficient, so that the gear 3-2 and the gear 3-1 are coupled to each other with the frictional force between the surfaces.

In the exemplary embodiments described above, the configuration using the compression coil spring 4, the E-type retaining ring 9, and the flange 5c is exemplified. However, the present disclosure is not limited to this configuration. For example, a configuration may be employed in which the rotation shaft 5 and the gear 3-2 are integrally formed, so that both the rotation shaft 5 and the gear 3-2 rotate. In this configuration, the compression coil spring 4 is not required.

Whether each gear is a spur gear or a helical gear is not limited to the configurations in the exemplary embodiments described above. For example, in the configuration according to the first exemplary embodiment, the gear 2 and the gear 3-1 may be spur gears instead of helical gears. More specifically, the gears other than the gear 3-2 and the gear meshing with the gear 3-2 may each be a spur gear or a helical gear, as long as the gear 3-2 and the gear meshing with the gear 3-2 are spur gears.

The number of gears in the driving device 101 is not limited to those in the exemplary embodiments described above. For example, in the configuration according to the third exemplary embodiment, a stepped gear and a spur gear may further be provided between the stepped gear 11 and the gear 6.

In the exemplary embodiments described above, the configurations of the lens driving device incorporating the driving device are exemplified. However, the present disclosure is not limited to these configurations. More specifically, the lens barrel incorporating the driving device described in the exemplary embodiments may be employed instead of the lens driving device attachable to the lens barrel. This lens barrel is an interchangeable lens incorporating a plurality of lens units as described above, or a lens device fixedly attached to the camera main body described above.

In the exemplary embodiments described above, the configurations of the lens driving device attachable to the lens barrel including the lens driving ring 202 for zooming are exemplified. Alternatively, the lens driving device may be attachable to the lens barrel including the lens driving ring for zooming and a lens driving ring for focusing. Furthermore, the power-driven object may be the lens driving ring for zooming or the lens driving ring for focusing. Alternatively, a configuration may be employed in which a magnification-varying lens unit moves when the lens driving ring for zooming is rotated, and the focus lens unit is moved by rotation of a cam barrel and by a stepping motor or an ultrasonic motor, in accordance with the movement of the ring.

In the exemplary embodiments described above, the configurations including the gears serving as the driving members are exemplified. However, the present disclosure is not limited to the configurations. For example, a configuration of using a rubber roller as the driving member instead of the gears may be employed. In other words, the driving members may be rubber rollers in contact with each other instead of the gears meshing with each other.

The driving device according to the exemplary embodiments described above indicates the driving device 101 itself, the lens driving device 400, and further the driving device 101 incorporated in the lens barrel.

In the configurations described above in the exemplary embodiments, the gear 3-1 is provided with the recesses, and the gear 3-2 is provided with the protrusions. However, the present disclosure is not limited to this configuration. For example, a configuration may be employed in which the gear 3-1 is provided with the protrusions and the gear 3-2 is provided with the recesses.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-028389, filed Feb. 17, 2016, which is hereby incorporated by reference herein in its entirety.

What is claimed is:

1. A driving device configured to transmit driving force to a manual operation member operable by a user, the manual operation member being configured to be rotatable, the driving device comprising:
   a driving source;
   a rotation shaft;
   a first driving member configured to be rotatable about an axial direction of the rotation shaft and that has a position fixed in the axial direction;

a second driving member that has a smaller diameter than the first driving member, is rotatable about the axial direction and configured to move in the axial direction to be coupled with the first driving member so that the driving force from the driving source becomes transmittable to the manual operation member, and further configured to move in the axial direction to be decoupled from the first driving member so that the driving force from the driving source is prevented from being transmitted to the manual operation member; and a selection unit configured to select a position of the second driving member in the axial direction between a first position in which the second driving member is coupled with the first driving member and a second position in which the second driving member is decoupled from the first driving member, wherein the driving force from the driving source is transmitted to the manual operation member in a case that the selection unit selects the first position as the position of the second driving member in the axial direction, and wherein the second driving member is held at the second position in a case that the selection unit selects the second position as the position of the second driving member in the axial direction.

2. The driving device according to claim 1, wherein the second driving member includes a protruded portion and the first driving member includes a recessed portion into which the protruded portion engages, and wherein the second driving member and the first driving member couple with each other in a case that the protruded portion engages in the recessed portion.

3. The driving device according to claim 2, wherein the protruded portion includes a first inclined surface, and the recessed portion includes a second inclined surface capable of coming into contact with the first inclined surface in a case that the protruded portion engages in the recessed portion.

4. The driving device according to claim 1, wherein the second driving member is in contact with a driving member adjacent to the second driving member regardless of whether the second driving member is coupled with the first driving member or not.

5. The driving device according to claim 1, further comprising:

a third driving member configured to transmit the driving force to the manual operation member via the second driving member, and a fourth driving member configured to transmit the driving force to the third driving member via the second driving member.

6. The driving device according to claim 5, wherein the second driving member is in contact with the fourth driving member regardless of whether the second driving member is coupled with the first driving member.

7. The driving device according to claim 5, wherein the second driving member is a spur gear and the fourth driving member is a spur gear.

8. The driving device according to claim 1, wherein the second driving member is a spur gear, and the first driving member is a helical gear.

9. The driving device according to claim 1, wherein the second driving member moves together with the rotation shaft in the axial direction.

10. The driving device according to claim 1, wherein the driving device is a lens driving device attachable to and detachable from a lens barrel including a lens unit movable in an optical axis direction and the manual operation member, and wherein the driving force from the driving device is transmitted to the lens unit in a state where the second driving member is coupled with the first driving member.

11. The driving device according to claim 1, wherein the driving device is provided to a lens barrel including a lens unit movable in an optical axis direction and manual operation member, and wherein the driving force from the driving device is transmitted to the lens unit in a state where the second driving member is coupled with the first driving member.

12. The driving device according to claim 1, wherein the selection unit is a switch member that can be accessed from an outside of the driving device.

* * * * *